Patented Jan. 16, 1945

2,367,462

UNITED STATES PATENT OFFICE 2,367,462

UTILIZATION OF WOOD ACIDS

Eduard Färber, New Haven, Conn., assignor to Polyxor Chemical Co., Inc., New Haven, Conn., a corporation of New Jersey No Drawing. Application April 15, 1942, Serial No. 439,105

1 Claim. (Cl. 106—123)

My invention relates to a type of oil-material which I believe to be new and which has various uses. Generally, this material is suitable for lubricating purposes; at least some of its forms can be used for rust-proofing metals; at least some of its forms are emulsifiable with water under appropriate conditions, etc. My invention relates also to a process for producing this material from a substance which, for the most part, occurs commonly as a by-product of the chemical utilization of wood, namely, tall oil.

Speaking generally, my process comprises mixing tall oil with a reagent or reagents of a kind capable of neutralizing acids, the quantity of the reagent or reagents being, however, far too small to neutralize all the acid of the tall oil, and then heating the resulting mixture and removing a certain part of the mass by evaporation. The residue left after this evaporation is the material referred to above.

In some respects this present process resembles the process of my co-pending Serial No. 304,446, filed November 14, 1939, now Patent No. 2,337,237, patented Dec. 21, 1943. In that application I have pointed out that by the fractional distillation of high boiling wood acids to which a neutralizer or neutralizers have been added, a number of fractions of differing characteristics and compositions can be obtained, together with a relatively small quantity of a mostly solid residue. About 80% to 90% of the organic material is distilled off in that formerly described operation. Additionally, however, I have discovered that the reaction or reactions preceding the end of a certain stage of those operations, are such that the undistilled residue near the end of that stage is a stable, viscous, oily material of relatively low acidity, and one which tends to become quite or substantially neutral at the end of that stage. Because of those and other characteristics, this material is suitable for various uses, some of which are indicated above. At or near the end of this stage, therefore, I discontinue heating and evaporating in the present instance, in order to secure this reisdue. Usually only about 15% to 30% of the mass is evaporated in the present process. With the present process, too, it is well to permit or cause the partial neutralization of which the small quantity of the reagent is capable, to come to completion, as by stirring and generally heating somewhat, before beginning the evaporation or at least before proceeding beyond that first stage of evaporation which yields mostly water.

The reactions producing the products of both my prior application and my present process appear to be complex ones. The desired residue of my present process is not simply a mixture of the residue and final distillates of my prior application. Neither is my present residue simply the salts that might be expected from the interaction of the neutralizing reagent and a corresponding part of the tall oil acids. Instead of the latter, the reactions which produce my present product, are such that a much larger fraction of the tall oil acids than the reagent is capable of neutralizing by the direct and simple formation of salts, is converted into a substantially neutral oil or oils of the nature of hydrocarbons. For example, in a typical case, if the original acidity is called 100, the neutralizing agent may be equivalent to 14, or about one-seventh. The material evaporated during the heating may have an acid value of from 12 to 20, and the acid value of the residue may be from about 0.5 to 2. In other words, although the reagent in such a typical case is sufficient to neutralize only about one-seventh of the acids, about five-sevenths or more of the original acid is reduced to a neutral condition and converted into hydrocarbon oils.

As before mentioned, the organic raw material for this process is tall oil. That is to say, it is that mixture of aliphatic and aromatic acids which is recovered from the soap which is separated from the so-called "black liquor" residue resulting from the treatment of wood with caustic soda or caustic soda and sodium sulphide in the manufacture of pulp. The reagent may be any substance that is capable of forming a salt or salts with the tall oil acids. Herein I use the term "neutralizer" for substances of this class. Ordinarily, I select as a neutralizer such a material or materials as will not leave an undesired substance in the residue, or in the evaporator in case the evaporator is condensed for further use. Of the inorganic neutralizers I prefer the hydroxides and oxides of the alkali, the alkaline earth, and the earth metals, such as sodium hydroxide, calcium oxide, aluminum hydroxide. Either a single neutralizing substance can be used, or a number of neutralizers can be used together.

As before indicated, the quantity of the neutralizer used in my process is relatively small. Specifically, the quantity used is less than half, and in most cases is less than one-third, the quantity required for complete neutralization of the acids present in the tall oil. Generally, the upper limit for any neutralizer is that at which evaporation of the mixture is not feasible under the conditions employed. For example, if 100 kilograms of tall oil are mixed with 5 kilograms of calcium oxide (i. e. sufficient to neutralize something more than one-half of the acids), the mass becomes so viscous on heating that it is difficult to cause evaporation from it at atmospheric pressure; on the other hand, a mixture of the same quantity of tall oil and 2 kilograms of calcium oxide is readily evaporated to a sufficient extent, at substantially atmospheric pressure, to yield a good residue. Generally, the lower limit is fixed by the viscosity which the operator desires the residue to have, the rule being that the smaller the quantity of neutralizer used, the less viscous is the residue and the lower is its pour point. For instance, increasing the amount of sodium hydroxide from 1% to 2% and removing about 20% of the original oil by distillation may increase the pour point from about 5° to 45° C. Ordinarily the lower limit is not much less than one-twentieth of the quantity required for complete neutralization of the acid or acids present in the base raw material. Within these limits the ratio of quantity of neutralizer to the quantity of high boiling wood acid or acids may be varied to increase or decrease the ratio of quantity of evaporate to quantity of residue, for example when the evaporate has a commercial value and is recovered by condensation; the general rule is that the smaller the ratio or neutralizer to acid, the greater is the quantity of acidic material given off in the evaporate and the smaller is the quantity of neutral residue. Within these limits also the ratio of neutralizer to acid is dependent, somewhat, on the particular kind of neutralizer employed. The polyvalent neutralizers are generally somewhat more effective in reducing the total acidity than the monovalent neutralizers, at least within the lower ratios of neutralizers to acids.

The amount of neutralizer used within the limits set forth also influences the residue with respect to its ability to form emulsions. In general, the greater the amount of neutralizer used the greater is the emulsifiability of the product under the conditions usual for producing oil emulsions, such as the addition of ammonia or organic ammonia derivatives to the water added to the oil to give it an alkaline reaction. Otherwise the residues, and especially those residues which are produced with the smallest amounts of polyvalent inorganic neutralizers, are very stable against water and steam. All these residues mix readily with mineral oils, f. i. to 100 parts of residue by weight, 50 to 100 parts of mineral lubricating oil can be added to form a stable lubricant or surface treating oil.

In carrying out the process, the neutralizer or neutralizers and the base raw material, namely tall oil, are mixed together. Preferably the mixing is done under such conditions as facilitate a prompt reaction with the neutralizer. Thus, preferably, the base raw acidic material is first heated to a temperature above 100° C., usually to about 120° C., and the neutralizer is added to it at this temperature, with stirring or other agitation, so that the neutralizer will be well distributed throughout the mass. If too high a temperature is used however, the reaction may be too violent with large quantities, and difficulty may be experienced from foaming. A sufficiently lower temperature may then be substituted. The catalyst or catalysts, when used, can be mixed with the acid at the same time as the neutralizer, although it can be added subsequently. The neutralization being exothermic, the temperature of the mass tends to rise. After the mixing of the ingredients, more heat is applied. The first result is the evaporation of the water of neutralization and any other water that may be present. Further heat is then applied (usually after the neutralization reaction has come to completion), to raise the temperature to about or above 300° C., assuming that the operation is carried out at pressure substantially equal to atmospheric pressure, and a distillate is produced which is distinctly acid in character and which condenses at normal temperatures to an oily liquid (which is only scarcely miscible with water), together with carbonic acid and small amounts of other gases which do not condense easily. This condensed oily liquid can form salts and esters useful for several industries. The evaporation is continued, with higher temperatures as necessary, until the acidity of the distillate leaving the mass drops considerably, or to state the matter in another way, until the residue has become neutral or substantially so. Frequently it is necessary to raise the temperature, under atmospheric pressure, to about 360° C. before this condition is reached. In some cases it is advantageous or satisfactory to discontinue the heating when an acidic value corresponding to an acid number of 30 to 40 in the distillate and 10 to 20 in the residue is reached. In any event, when the residue has become neutral, or neutrality sufficiently approximated, the operation is terminated and the residue secured. To facilitate the evaporation, well-known means can be used; for instance, reducing the pressure a little below atmosphere by pumps, or forcing gases through the heated mass. Pressures differing considerably from atmospheric pressure, after the water of neutralization and any other water that may be present have been driven off, produce other reactions.

The following are a few specific examples of my process, all at substantially atmospheric pressure, and of the desired new material of my invention:

*Example 1.*—100 kilograms of tall oil are heated to 130° C., and while at this temperature 1.5 kilograms of calcium hydroxide in the form of a fine powder are added and thoroughly stirred into the tall oil. The temperature rises, due to the heat of neutralization, and heat is applied to continue the temperature rise, gradually, and preferably the stirring is continued, until most of the water of the mixture is driven off. The heating then is continued and the temperature further increased up to somewhat over 300° C., when a nearly colorless acidic oil begins to leave the mass, together with some carbonic acid and other gases which are not condensable at room temperature. This acid oil has commercial value as before indicated, and usually I recover it by condensation. The distillation is continued (with such heating and stirring as is necessary), and after about 25 kilograms of the oily distillate have been produced, the acid content of the oil vapors rising from the mass has dropped from an initial acid number of about 150 to less than 40. The residue at this stage shows an acid number of around 20 or less in organic solvents, which is satisfactory for rust-proofing purposes. Accordingly I may stop the evaporation at this stage, and cool the residue, for instance, by counter-current contact to new quantities of starting material. This residue is an oil which has a viscosity expressed in Saybolt seconds of about 90,000 at 20° C., and about 450 to 500 at 100° C. Should an oil of less acidity be required, I continue the evaporation correspondingly longer, which, however (with the proportions stated), produces a more viscous oil. The oil residue in both these instances is the new material of my invention. The operations of this example are carried on at substantially atmospheric pressure. This residue can be mixed with other oils, for instance mineral oils of lower viscosities, say one part of mineral oil for two parts of my residue.

*Example 2.*—100 kilograms of tall oil are mixed with 600 grams of aluminum hydroxide. and treated as in Example 1. When the evaporation has been continued until about 15 kilograms of the acid oil have been driven off, the residue, i. e. my new material, is a substantially neutral oil of high viscosity.

*Example 3.*—100 kilograms of tall oil and 2 kilograms of sodium hydroxide are treated as in Example 1, and the evaporation continued until about 20 kilograms of the acid oil have been driven off. The residue is a waxy solid at room temperature. It can be emulsified in water.

While I have described my process substantially as applied to separate and distinct batches of the initial mixture, it will be understood that it can be carried on as a continuous process; also, the final residue can be cooled by, and in turn heat, fresh mixture by passing the two through heat exchangers; etc., etc. In general, it is to be understood that my invention is not limited to the details of the description above except as appears hereafter in the claim.

I claim:

The process which consists in mixing tall oil at above 100° C. with a neutralizing agent selected from the group consisting of the inorganic oxides and hydroxides, the quantity of the neutralizing agent being not more than about one third and not much less than about one twentieth of the quantity calculated for the neutralization of the total acidity of the tall oil, heating the mass to about 300° C. and evaporating therefrom, at about atmospheric pressure, until the residue is substantially neutral.

EDUARD FÄRBER.